United States Patent [19]

Madden

[11] Patent Number: 4,575,006

[45] Date of Patent: Mar. 11, 1986

[54] NOZZLE FLAP EDGE SEAL

[75] Inventor: William M. Madden, Palm Springs, FL

[73] Assignee: United Technologies Corporation, Hartford, Conn.

[21] Appl. No.: 503,954

[22] Filed: Jun. 13, 1983

[51] Int. Cl.$^4$ ............................................. F02K 1/06
[52] U.S. Cl. ................................. 239/265.29; 60/229; 60/271; 239/265.37; 244/12.5; 244/110 B; 277/236
[58] Field of Search ...................... 239/265.27, 265.29, 239/265.33, 265.37; 244/110 B, 12.4, 12.5, 23 D; 60/229, 232, 271; 277/236

[56] References Cited

U.S. PATENT DOCUMENTS

| | | | |
|---|---|---|---|
| 4,013,226 | 3/1977 | Willard | 239/265.29 |
| 4,098,076 | 7/1978 | Young et al. | 60/271 |
| 4,182,501 | 1/1980 | Fage | 239/265.37 |
| 4,206,893 | 6/1980 | Howard | 244/110 B |

FOREIGN PATENT DOCUMENTS 2078306  1/1982  United Kingdom ................. 60/271

Primary Examiner—Andres Kashnikow
Assistant Examiner—Michael J. Forman
Attorney, Agent, or Firm—Stephen E. Revis

[57] ABSTRACT

A seal plate rests along the edge of a moveable flap surface and extends outwardly therefrom into contact with a stationary wall to seal the gap between the flap edge and the wall. The seal plate is hinged for rotation to one end of a pivotable support link which is hinged at its other end to the flap. The gas pressure load on the seal plate presses it against the flap surface and also tends to rotate the support link to press the outward edge of the seal plate against the stationary wall.

9 Claims, 5 Drawing Figures

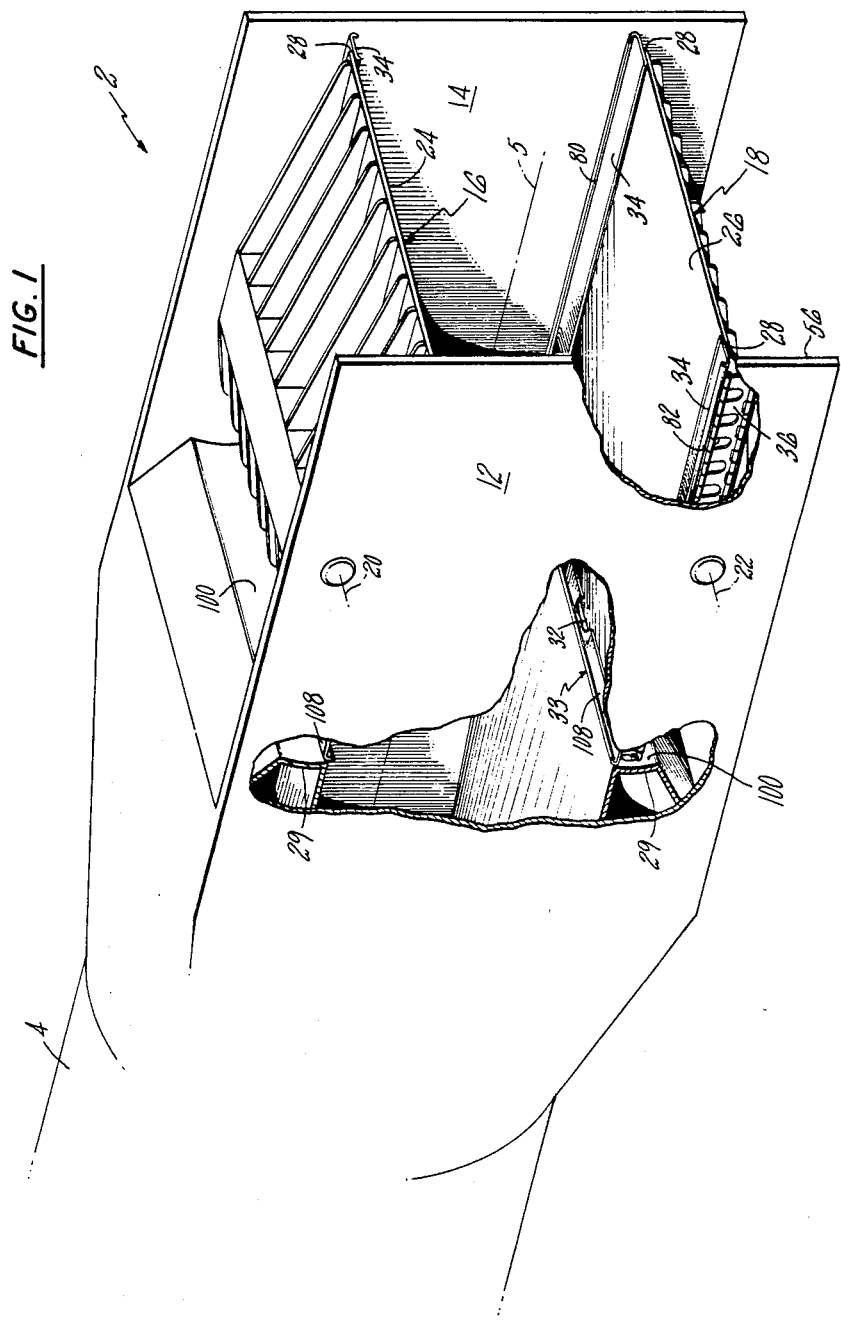

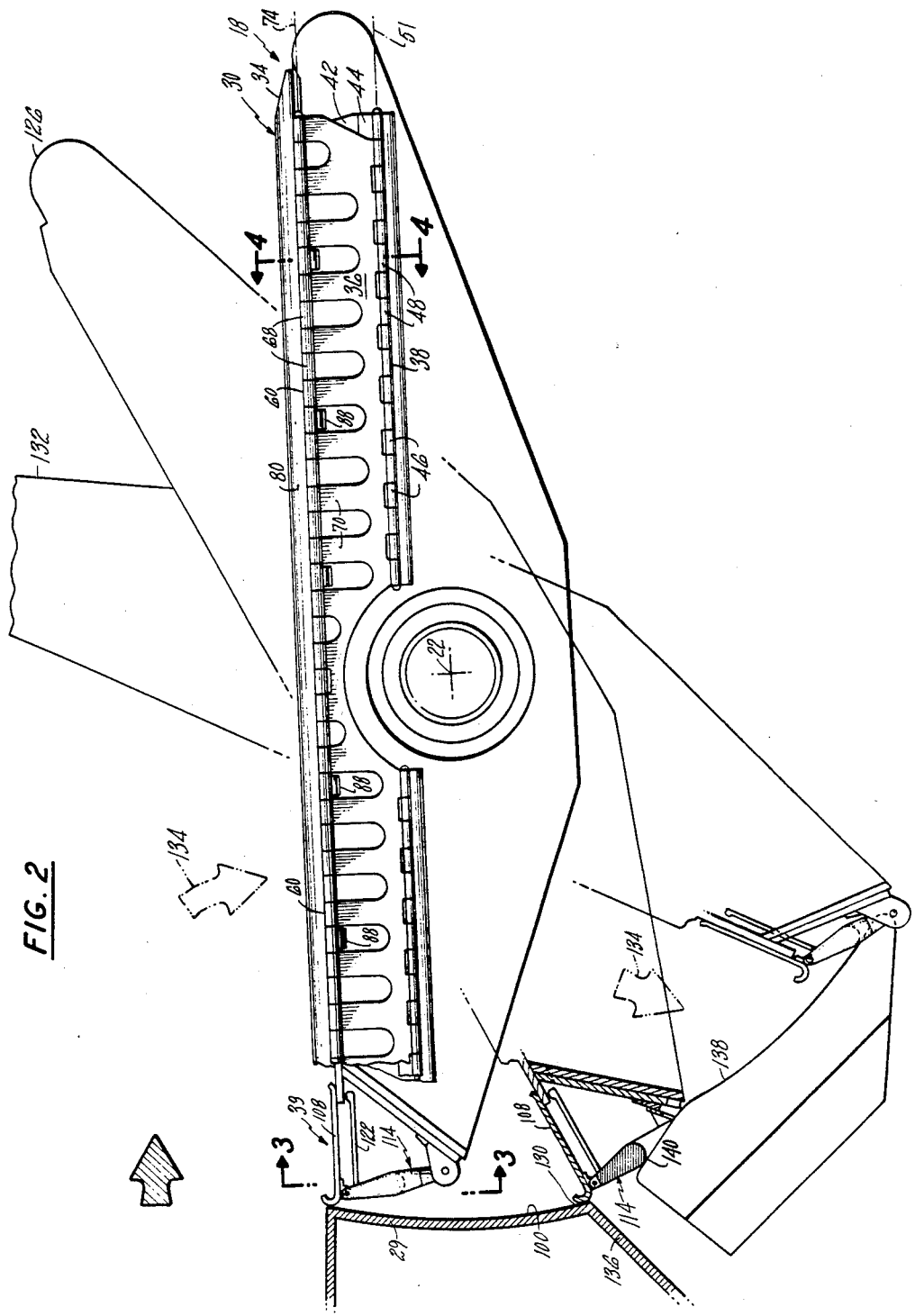

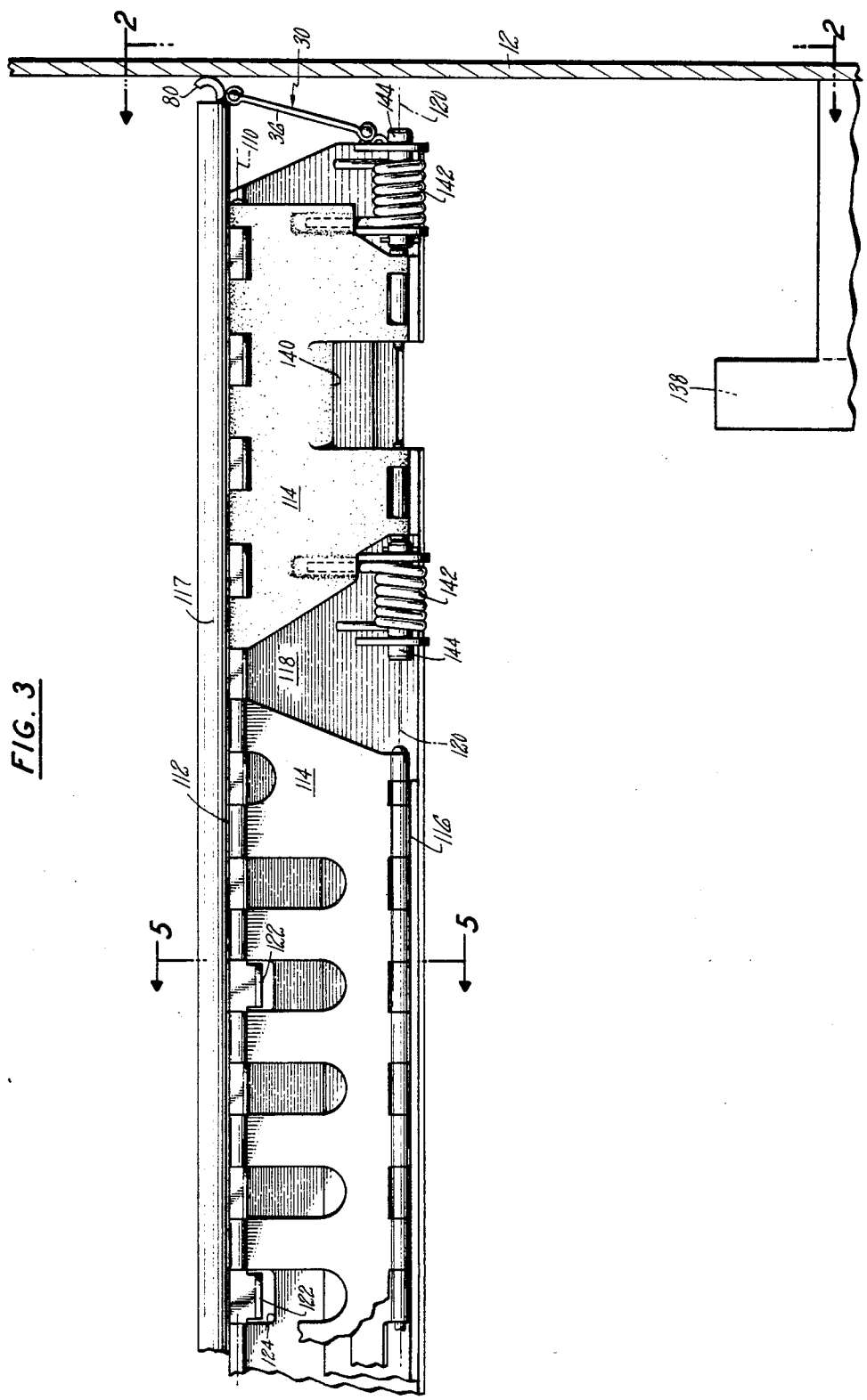

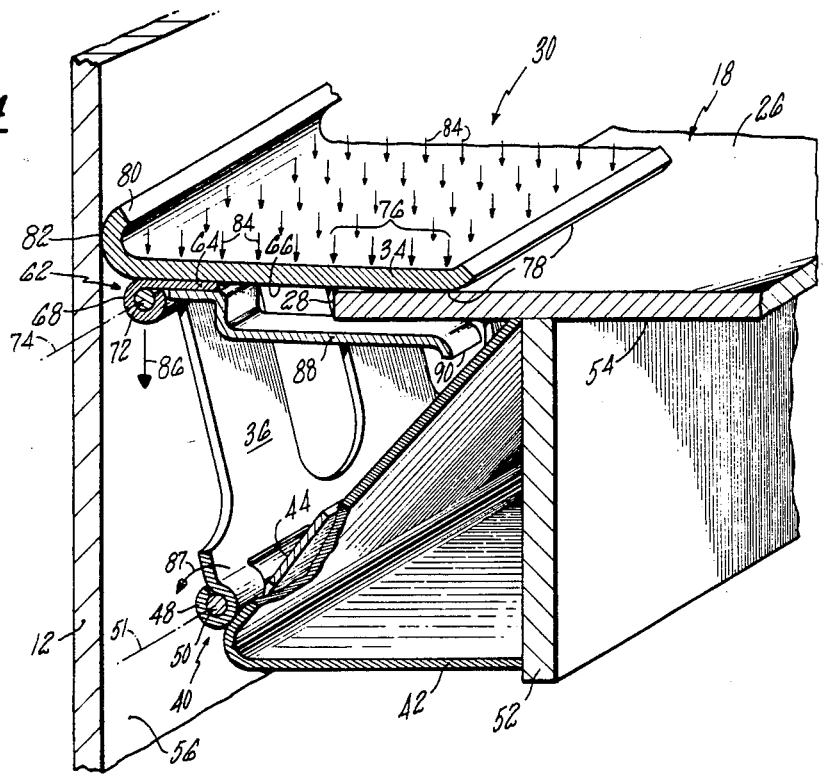

NOZZLE FLAP EDGE SEAL

DESCRIPTION

1. Technical Field

This invention relates to seals between the edges of a movable flap and adjacent fixed wall surfaces.

2. Background Art

Gas turbine engine variable area two dimensional nozzles typically include flaps which move and/or rotate between opposed parallel nozzle side walls. The seal between an edge of the flap and the nozzle side wall is typically a flexible metal sheet extending the length of the flap edge and having one of its longitudinally extending edges welded or otherwise fixed to the flap and the opposite other edge in sliding contact with the side wall, whereby the pressure load on the sheet metal seal forces it against the nozzle side wall to form a seal during nozzle operation. Seals of this nature are shown in FIGS. 3 and 4 of U.S. Pat. No. 4,013,226. It is difficult and sometimes not possible to design such prior art seals to work satisfactorily. The seals operate on the cantilever principal and, therefore, must be made thin enough and long enough to permit them to bend sufficiently under gas load to provide adequate sealing pressure against the wall. Sometimes the seals must be so thin they buckle under load and do not slide smoothly against the wall. This can result in permanent damage to the seal, as well as excessive wear of the nozzle side wall. If the seal is made thick enough to prevent buckling, it may not conform well to the wall and thus not seal adequately.

DISCLOSURE OF INVENTION

One object of the present invention is means for sealing between the edge of a movable exhaust nozzle flap and an adjacent stationary wall, wherein the sealing force is created essentially by gas pressure loads.

Another object of the present invention is a nozzle flap edge seal which can be designed to withstand large pressure loads without creating excessive forces against the nozzle wall surface during flap movement.

A further object of the present invention is a seal between the edge of a movable exhaust nozzle flap and an adjacent stationary wall, wherein the normal force between the seal and the wall may be minimized to reduce wear while still being sufficient to provide adequate sealing.

Accordingly, a seal between the edge of a movable flap and an adjacent stationary wall includes a seal plate extending along at least a portion of the length of the flap edge and pivotally attached to support means which, in turn, is pivotally attached to the flap, wherein a first portion of the seal plate is in sealing contact with a surface of the flap adjacent and along the edge to be sealed, and a second portion of the seal plate extends outwardly of the edge in sealing contact with the wall, wherein the support means, seal plate, and pivot points are so arranged that a gas pressure load on the seal plate simultaneously presses the first and second portions of the seal plate against the flap and wall, respectively.

In a preferred embodiment, the seal plate extends the length of the flap edge to be sealed and bridges the gap between the flap edge and the adjacent wall, one longitudinally extending edge of the plate resting against the surface of the flap, and the other contacting the adjacent wall. The plate is hinged for rotation about a first axis to one end of a support link, and the other end of the support link is hinged to the flap for rotation about another axis parallel to the first axis. The gas pressure loads on the seal plate creates moments about these axes, which moments urge the support link to rotate about the second axis and the seal plate to rotate about the first axis. Proper placement of these axes relative to each other and to the gas load on the seal plate results in the seal plate being simultaneously pressed against the flap surface and the stationary wall, effectively creating a seal between the wall and the edge of the flap. The location of the two pivot axes relative to the magnitude and direction of the gas load on the seal plate may be selected, at the time of design, to provide the desired sealing force between the seal plate and the wall. This sealing force will generally be selected to be the minimum needed to provide adequate sealing, so as to minimize wear between the moving seal plate and the stationary wall during operation.

The foregoing and other objects, features and advantages of the present invention will become more apparent in the light of the following detailed description of preferred embodiments thereof as shown in the accompanying drawing.

BRIEF DESCRIPTION OF THE DRAWING

FIG. 1 is a simplified perspective view, partly broken away, showing a variable area converging exhaust nozzle which incorporates the seals of the present invention.

FIG. 2 is a view taken along the line 2—2 of FIG. 3, with the nozzle side wall removed, showing the lower flap and rear edge seal of the nozzle of FIG. 1 in several positions, and also showing a side edge seal.

FIG. 3 is a view in the direction 3—3 in FIG. 2.

FIG. 4 is a sectional, perspective view taken along the line 4—4 in FIG. 2.

FIG. 5 is a sectional view taken along the line 5—5 in FIG. 3.

BEST MODE FOR CARRYING OUT THE INVENTION

FIG. 1 is a simplified perspective view of a variable area, converging exhaust nozzle assembly 2 for a gas turbine engine. The exhaust nozzle assembly 2 is secured to the rearward end of a turbine exhaust case 4. The engine axis is designated by the numeral 5. The exhaust nozzle assembly 2 comprises opposed, parallel, side walls 12, 14, and upper and lower exhaust nozzle flaps 16, 18, respectively, extending between and pivotally secured to the side walls 12, 14 for rotation about axes 20, 22 respectively. The axes 20, 22 are perpendicular to the walls 12, 14. The side walls 12, 14 and the radially inwardly facing opposed front surfaces 24, 26 of the upper and lower flaps 16, 18, respectively, define the exhaust nozzle gas flow path. In this embodiment, the exit area of the gas flow path is also the nozzle throat, which may be varied by rotating the flaps 16, 18.

In order to maximize nozzle performance, leakage of the exhaust gases from the gas flow path upstream of the nozzle exit around the edges of the flaps must be minimized. Thus, seals need to be provided between the side walls 12, 14 and the side edges 28 of the flaps 16, 18, as well as between the nozzle assembly front wall 29 and the front edges 32 of the flaps 16, 18. These seals are best shown in FIGS. 2 through 5.

FIG. 2 shows the lower portion of the exhaust nozzle assembly 2 looking along the axis 22 of the lower flap 18 with the side wall 12 removed to show a side edge seal assembly 30 and a front edge seal assembly 33. Similar (i.e. mirror image) seal assemblies are disposed along corresponding edges of the upper flap 16. The side edge seal assembly 30, shown best in FIGS. 2 and 4, comprises a seal plate 34 and a support member 36. One longitudinally extending edge 38 of the support member 36 is pivotally secured to the flap 18 through hinge means 40 and brace 42. The hinge means 40 includes a hinge member 44 having knuckles 46, the knuckles being interleaved with fingers 48 formed along the edge 38 of the support member 36. A hinge pin 50 passes through the fingers and knuckles and has an axis 51 parallel to the front surface 26 of the flap 18, parallel to the surface 56 of the side wall 12, and perpendicular to the axis 22 of the flap 18. The hinge member 44 is welded to the longitudinally extending brace 42 which, in turn, is rigidly secured, such as by welding, to a longitudinally extending rib 52 of the flap 18. The rib 52 is one of a number of ribs welded to the back surface 54 of the flap 18 to provide structural rigidity thereto.

The seal plate 34 is hinged to the other longitudinally extending edge 60 of the support member 36 by hinge means 62. The hinge means 62 includes a hinge member 64 welded to the back surface 66 of the seal plate 34. The hinge member 64 includes knuckles 68. The knuckles 68 are interleaved with fingers 70 of the support member 36. A pin 72 completes the hinge, and has an axis 74 parallel to the axis 51. The support member 36 is like a connecting link between the seal plate 34 and flap 18.

In this embodiment, the seal plate 34 is an essentially flat piece of material (metal). A portion of the surface 66 of the seal plate 34 rests on and is moveable relative to the surface 26 of the flap 18 along a line 78, which line is perpendicular to the axis 22, parallel to the axis 51, and which extends substantially along the full length of the flap 18 adjacent the edge 28. The plate 34 extends outwardly from the edge 28 of the flap 18 to the wall 12. The edge of the plate 34 adjacent the wall 12 includes a lip 80. The curved surface 82 of the lip 80 contacts the surface 56 of the wall 12 substantially along a line parallel to the axis 51.

The gas pressure load during operation of the nozzle is represented by the arrows 84 which are perpendicular to the surface of the plate 34. The gas pressure tries to rotate the plate 34 in a clockwise direction (in FIG. 4) about the line 78, while also pressing that portion of the surface 66 in the vicinity of the line 78 against the surface 26 to create a seal along the length of the line 78. The pressure load 84 also results in a force, represented by the vector 86, on the support member 36 through the hinge means 62. Due to the spatial relationship between the axes 51 and 74 of the hinge means 40, 62 respectively, the force 86 creates a moment 87 about the axis 51 urging the seal plate 34 against the wall 12. Thus a good seal is created between the surface 56 of the wall 12 and the surface 82 of the seal plate 34.

The magnitude of the sealing force along the line of contact of the surface 82 against the surface 56 can be controlled or selected at the time of designing the seal by judicious placement of the axes 51 and 74, relative to each other. Thus, referring to FIG. 4, as the attachment point of the hinge means 62, and thus the axis 74, is moved to the right (i.e. toward the edge 28 of the flap 18) the moment 87 on the support member 36 about the axis 51 is reduced; and the sealing force between the lip 80 and the wall 12 is similarly reduced. If the hinge means 62 is moved far enough to the right the moment 87 on the support member 36 about the axis 51 can reverse direction, causing the seal plate 34 to move away from the wall 12.

Thus, within the physical limitations of the exhaust nozzle, the force between the seal plate 34 and the wall 12 may be tailored to the requirements and characteristics of the nozzle. Preferably the seal will be constructed so as to yield the minimum required sealing force against the surface 56 during all modes of nozzle operation. This would be done to minimize the amount of wear on the surface 56 as the lip 80 slides along the surface 56 during actuation of the flap 18. It can also be seen that, contrary to the prior art, the magnitude of the sealing force against the surface 56 is not dependent upon the thickness of the plate 34.

To assure that, during non-operation of the nozzle, the seal plate 34 does not slide inwardly away from the wall 12 so far that, upon start up of the engine, the moment 87 on the support member 36 would be in the wrong direction and prevent the seal from becoming operational, a plurality of tabs 88 are spaced axially along the hinge axis 74 and extend inwardly from the hinge means 62. The tabs 88 are spaced from the back surface 54 of the flap 18. The inward edge 90 of these tabs 88 would contact the brace 42 before the plate 34 could move far enough inward to cause the problem. The tabs 88 also prevent the seal plate 34 from rotating about the axis 74 of the hinge means 62 to an inoperable position when there are no gas loads on the plate 34. In many situations the tabs 88 or other means for preventing undesirable or unacceptable movement of the seal plate when there are no gas loads on the seal plate may not be required.

While in this embodiment of the present invention the hinge means 40 is located on the side of the flap 18 opposite the front surface 26, the seal assembly could also be constructed with the hinge means 40 on the same side of the flap 18 as the surface 26; however, such a construction would require structure, such as the rib 52, brace 42, and support member 36 to be located in the gas flow path.

The front edges 32 of the flaps 16, 18 each include a seal assembly for sealing against the rearwardly facing surfaces 100 of the walls 29. Each surface 100 is a portion of a cylinder formed by the locus of a line parallel to the axes 20, 22 of the upper and lower flaps 16, 18 as the lines are rotated about their respective axis 20, 22. The seal assembly 33 of the lower flap 18 is shown in FIGS. 2, 3, and 5. The seal assembly for the upper flap 16 would be essentially the mirror image of the seal assembly 33. The seal assembly 33 is similar in construction to the side edge seal assembly 30, and is therefore not described in as great detail.

The seal assembly 33 includes a seal plate 108 hinged for rotation about an axis 110 to one longitudinally extending edge 112 of support means 114. The other longitudinally extending edge 116 of the support means 114 is hinged to the flap 18 through rib means 118, for rotation about an axis 120. The axes 110, 120 are both parallel to the axis 22 of the flap 18. The forward end 115 of the plate 108 includes a lip 117 which contacts the surface 100 of the wall 29. The rearward end 119 of the plate 108 rests on the surface 26 of the flap 18 adjacent the flap rear edge 32. In this embodiment the front edge seal assembly 33 also includes a plurality of tabs 122 spaced axially along the hinge axis 110 to prevent rotation of the seal plate 108 when there are no gas loads on it. The rib means 118 includes cut-outs 124 aligned with each tab 122 to permit the seal assembly 33 to move rearwardly to the position shown in phantom in FIG. 5. The reason the seal assembly 33 must be able to move to the position indicated by the phantom lines of FIG. 5 is explained below.

FIG. 2 shows the full range of movement of the flaps 18. The upper flaps 16 move in a similar fashion. The flap position drawn in solid lines is the maximum open position of the nozzle during normal forward thrust operation of the engine. The view 126, partly in phantom, partly in outline, shows the position of the flap 18 which results in a minimum nozzle exit area during forward thrust operation. In that position it can be seen that the seal plate 108 is at the lower edge 130 of the cylindrical wall surface 100.

The upper and lower flaps 16, 18 can be rotated further to a thrust reversing position, represented by the position 132 of the lower flap 18 shown partly in phantom and partly in outline in FIG. 2. With the upper flap 16 in a similar position, the upper and lower flaps contact each other at the engine centerline 5 along their rearward most edges and block the downstream flow of gases. This causes some of the gases to flow in the direction of the phantom arrows 134 (FIG. 2) through an opening now created at the bottom of the exhaust nozzle between the wall 29 and the flap surface 26 to create reverse thrust. Corresponding reverse thrust flow of the exhaust gases occurs through a corresponding opening defined at the top of the exhaust nozzle between the wall 106 and the surface 24 of the upper flap 16.

It should be apparent from FIG. 2 that further counterclockwise rotation of the flap 18 beyond the position indicated by the phantom line 126 would, without special provisions, result in the seal plate 108 moving further forward (to the left in FIG. 2) since there would be no wall, such as the wall 29, to restrain it. Upon rotating the flap 18 clockwise to return it from its thrust reversing position 132 to a forward thrust position, such as the position 126, the seal plate 108 would strike the lower portion 136 of the wall 29, and the flap would be unable to rotate any further. In the present invention this potential problem is avoided by providing a cam surface 138 adjacent each side wall 12, 14, which cam surface intercepts the support means 114 as the seal plate 108 reaches the edge 130 of the surface 100 and the flap is about to move to a thrust reversing mode. The support means 114 serves as a cam follower, whereby, as it is rotated clockwise in FIG. 2 and FIG. 5, its specially provided surface 140 slides along the cam surface 138. The position of the front edge seal assembly 32 when the flap 18 is in its thrust reversing position 132 is shown in phantom in FIG. 5, and can also be seen in outline in FIG. 2. Springs 142 wrapped around pins 144 on the hinge axis 120 bias the support means 114 against the cam surface 138 and insure that the seal plate 108 returns to a sealing position against the surface 100 when the flap 18 is returned to a forward thrust position. The springs are only lightly loaded in forward thrust positions of the flap.

Although in this exemplary embodiment the flaps 16, 18, rotate about fixed axis 20, 22 respectively, it will be apparent that the seal assemblies of the present invention could also be used along the edges of flaps which translate as well as rotate, such as the flap shown in hereinabove referred to U.S. Pat. No. 4,013,226.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. An exhaust nozzle flap assembly, said flap assembly being rotatable about a first axis and comprising:
   a stationary wall surface;
   flap means including a flap member having a front surface defining a portion of a gas flow path, said flap member having an edge extending in a first direction adjacent said stationary wall surface, said front surface terminating at said edge; and
   seal means for minimizing leakage of gases from the gas flow path between said edge of said flap member and said stationary wall surface, said seal means including a seal plate and seal support means for connecting said seal plate to said flap member, said support means being pivotally secured to said flap means along a second axis extending substantially in said first direction, said seal plate having a first seal plate surface in sealing contact with said front surface of said flap member substantially along a line parallel to said second axis, said seal plate being moveable relative to said front surface, said seal plate also having means defining a second seal plate surface extending substantially parallel to said second axis and spaced outwardly of said flap member edge in sealing contact with said stationary wall surface, said seal plate being pivotally secured to said support means along a third axis parallel to and spaced from said second axis, said third axis being located with respect to said second axis such that a gas pressure load on said seal plate perpendicular to said front surface of said flap member creates a moment on said support means about said second axis and a moment on said seal plate about said third axis which moments tend to simultaneously urge said first seal plate surface against said front surface of said flap member and to urge said second seal plate surface against said stationary wall surface during nozzle operation.

2. The flap assembly according to claim 1 wherein said first axis is stationary and said first direction is parallel to said first axis.

3. The flap assembly according to claim 1 wherein said first direction is perpendicular to said first axis.

4. In a gas turbine engine exhaust nozzle having a pair of opposed, parallel walls, and a nozzle flap having a pair of opposite side edges, one each extending adjacent a respective one of said walls, said flap member having a front surface extending between said side edges substantially perpendicular to said walls, said front surface and walls defining at least a portion of a gas flow path, said nozzle also including means supporting said flap member for movement relative to said walls while maintaining the perpendicular relationship between said front surface and said walls, said flap member also having an upstream edge, a seal assembly for minimizing leakage of gases from the gas flow path between one of said side edges of said flap member and said nozzle wall adjacent said side edge, said seal assembly comprising:
   seal means including a seal plate and seal support means for connecting said seal plate to said flap member, said seal means being disposed along at least a portion of at least one of said flap member edges, said support means being hinged to said flap member along a first axis which is stationary with respect to said flap member, said first axis also being parallel to one of said nozzle walls and parallel to said flap member front surface, said seal plate having a first seal plate surface in sealing contact with said front surface of said flap member adjacent said one edge, said seal plate also having means defining a second seal plate surface extending substantially parallel to said first axis and in sealing contact with said one of said nozzle walls, said seal plate being hinged to said support means along a second axis parallel to and spaced from said first axis, and located with respect to said first axis such that a gas pressure load on said seal plate perpendicular to said flap member front surface simultaneously presses said first seal plate surface against said flap member front surface and creates a moment on said support means about said first axis resulting in said second seal plate surface being pressed against said one of said nozzle walls.

5. The seal assembly according to claim 4 wherein said first axis is located on the side of said flap member opposite said flap member front surface.

6. The seal assembly according to claim 4 wherein said flap member is adapted to rotate about a third axis which is stationary with respect to said flap member and with respect to said side walls and which is perpendicular to said side walls, the exhaust nozzle including a third wall upstream of said third axis and having a downstream facing surface defined by the locus of a line parallel to said third axis and rotated over a portion of a circular arc about said third axis, said flap member upstream edge being substantially parallel to said third axis and extending adjacent said downstream facing surface of said third wall, wherein said seal means is disposed along said upstream edge.

7. The seal assembly according to claim 6 wherein said seal means is disposed along each of said flap member side edges.

8. The seal assembly according to claim 6 wherein said downstream facing surface has a lower edge and said flap member is adapted to rotate to a thrust reversing position wherein said seal means is below said lower edge and out of contact with said third wall wherein said flap member front surface and said third wall are spaced apart defining a gas outlet therebetween, the exhaust nozzle including a stationary cam surface, and said support means including a cam follower surface wherein said cam surface and cam follower surface are adapted to contact each other during thrust reversing positions of said flap member and to position said seal plate into sealing contact with said third wall downstream facing surface upon rotating said flap member from a reverse to forward thrust position.

9. The seal assembly according to claim 4 wherein said seal means is disposed along each of said flap member side edges.

* * * * *